A. McWHORTER.
POTATO PLANTER.
APPLICATION FILED APR. 29, 1909.
959,154.
Patented May 24, 1910.
3 SHEETS—SHEET 3.
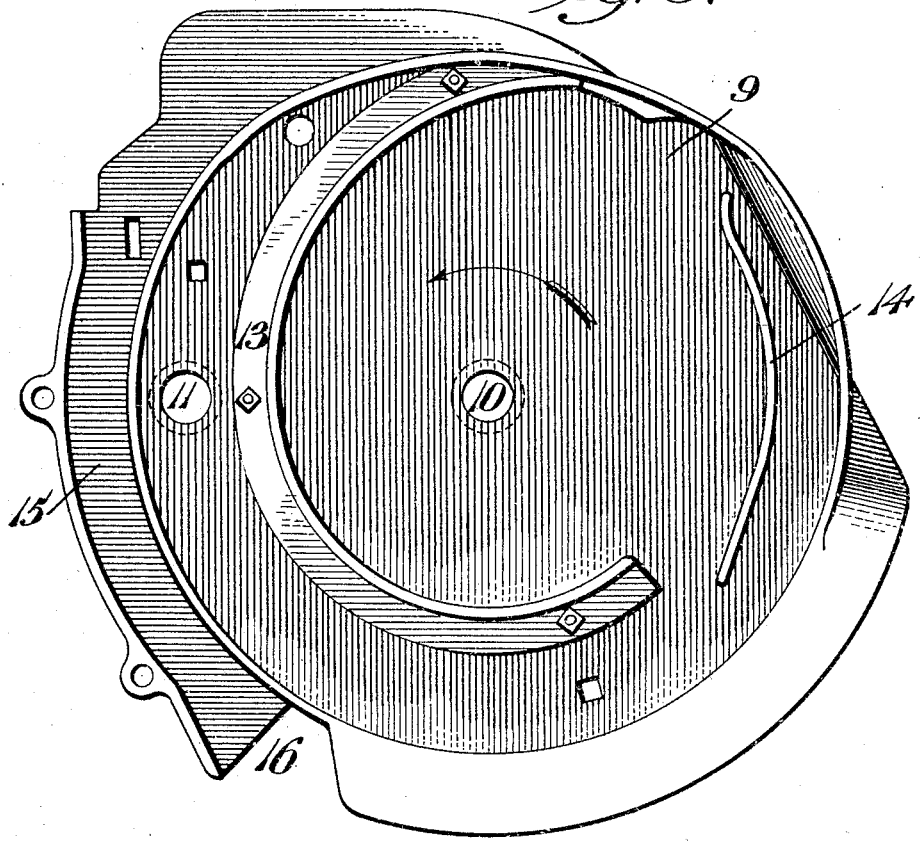
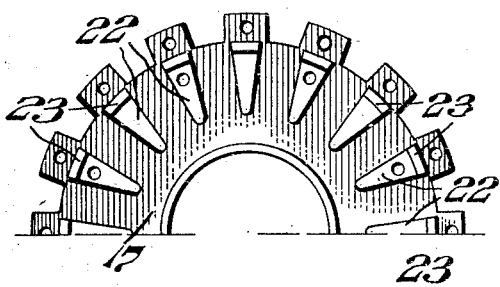
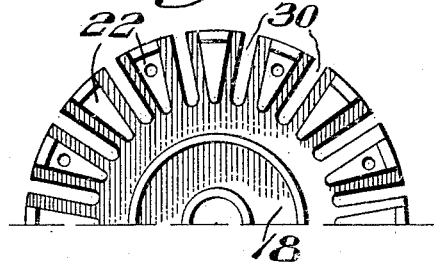
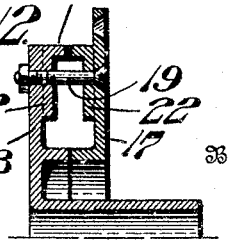
INVENTOR
Allen McWhorter
By Wiedersheim & Fairbanks
Attorneys
Witnesses
H. G. Dieterich
L. Douville

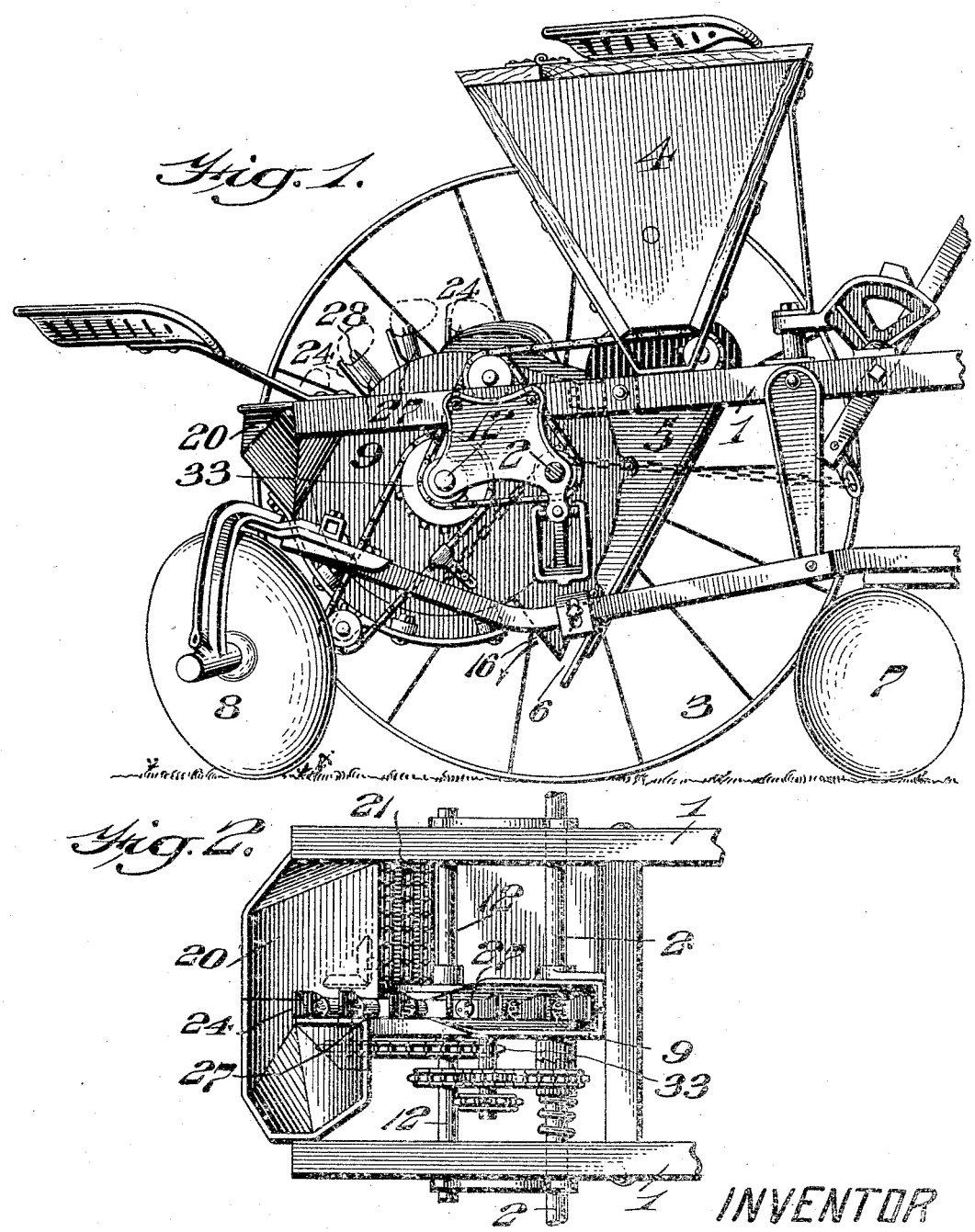

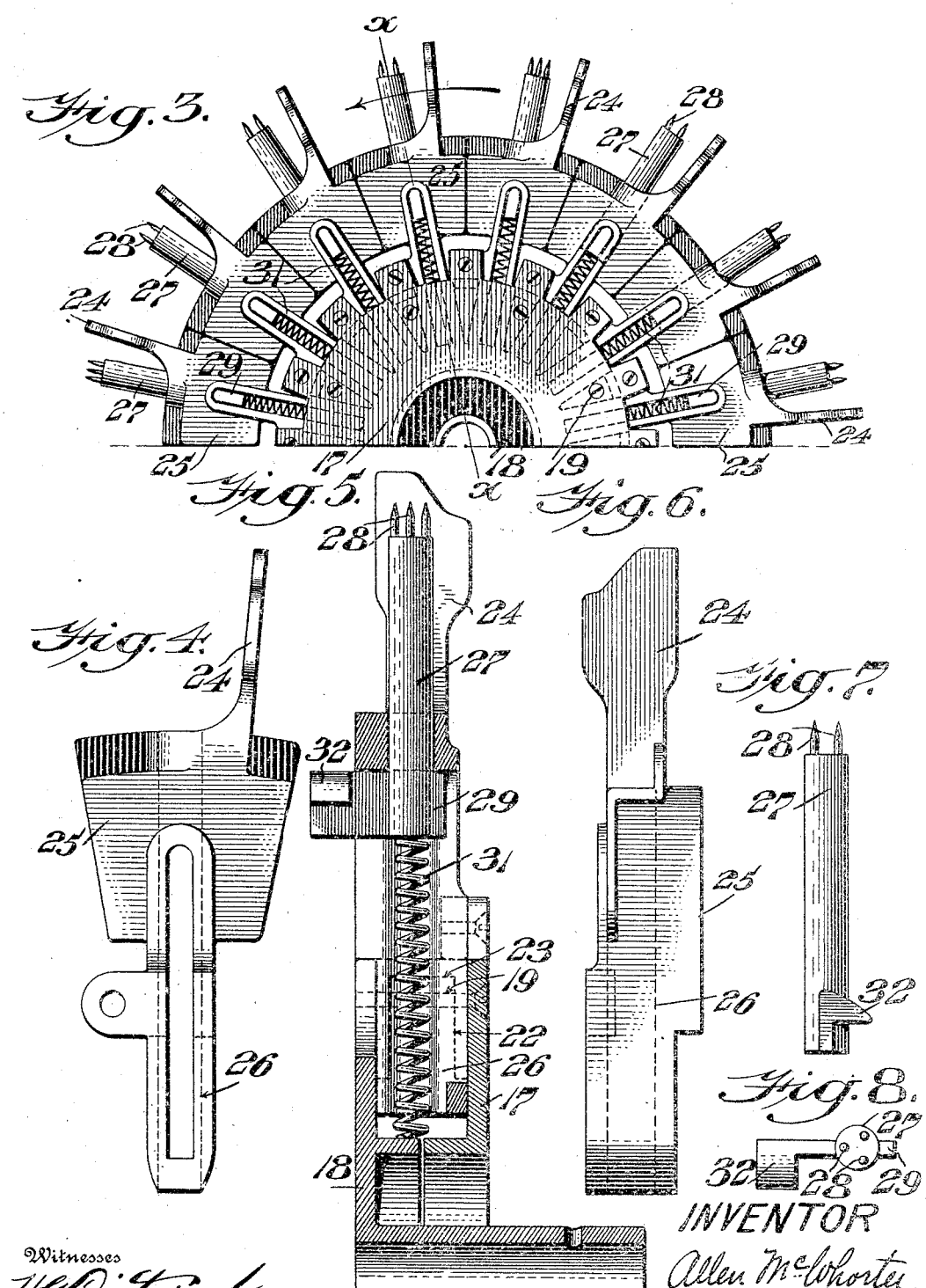

UNITED STATES PATENT OFFICE.

ALLEN McWHORTER, OF RIVERTON, NEW JERSEY, ASSIGNOR TO McWHORTER MANUFACTURING COMPANY, OF RIVERTON, NEW JERSEY, A CORPORATION OF NEW JERSEY.

POTATO-PLANTER.

959,154.   Specification of Letters Patent.   Patented May 24, 1910.

Application filed April 29, 1909. Serial No. 492,910.

*To all whom it may concern:*

Be it known that I, ALLEN McWHORTER, a citizen of the United States, residing in Riverton, county of Burlington, and State of New Jersey, have invented a new and useful Potato-Planter, of which the following is a specification.

This invention relates to agricultural implements and more particularly to potato planters and feeding mechanism therefor.

It has for an object to provide a potato planter with a mechanism for feeding the potatoes, which is simple in construction and efficient in operation and whereby the potatoes may be planted in regular sequence and at definite intervals in the furrow cut by a portion of the machine in a well known manner.

It consists broadly of a conveyer mechanism operating in connection with the potato hopper, whereby a number of impaling members forming a portion of the conveyer mechanism are normally held in a fixed position by means of a spring or like yielding mechanism and at certain intervals are retracted from this position by coöperating portions of the conveyer and then released, during which movement each impaler picks up a potato and carries the same to a suitable outlet adjacent to and in alinement with the furrow.

For the purpose of illustrating my invention I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of these instrumentalities, as herein shown and described.

Figure 1 represents a side elevation of a potato planting machine embodying my invention, certain portions, for convenience of illustration, being broken away. Fig. 2 represents a plan of the potato hopper and my novel actuating mechanism. Fig. 3 represents a side elevation of a portion of the conveyer mechanism. Fig. 4 represents a detail of a portion of the conveyer. Fig. 5 represents a section on line $x$—$x$ of Fig. 3. Fig. 6 represents an end elevation of the part shown in Fig. 4. Fig. 7 represents a detail of one of the impaling members. Fig. 8 represents a plan of the same. Fig. 9 represents one side of the conveyer casing showing the parts for coöperating with the impaling mechanism. Figs. 10 and 11 represent respectively, sides of a portion of the conveyer frame. Fig. 12 represents a section through a portion of the conveyer frame in detached position.

Similar numerals of reference indicate corresponding parts in the figures.

Referring to the drawings:—1 designates the frame of a planting machine embodying my invention, the same being suitably mounted on the axle or shaft 2 which is supported on the usual vehicle wheels 3. The frame 1 supports a hopper 4 adapted to contain a fertilizer which may be delivered by way of a discharge funnel 5 to an opening 6 located adjacent and alined with the furrows cut in the ground by the disk furrowers 7. These furrowers 7 are rotatably mounted upon the frame 1 in any well known manner, as are also the disk coverers 8, both serving the usual functions in machines of this type and operating substantially the same in my present machine as heretofore in the art.

9 designates a casing suitably mounted on the frame 1 and preferably consisting of two parts secured together in any desired manner and between which is supported my novel conveyer mechanism and it will be noted that suitable openings 10 and 11 are cut in each portion of the casing to permit the shaft 2 and a countershaft 12 to properly rotate and pass therethrough.

Referring to Fig. 9 of the drawings, the interior of one side of the casing 9 is shown, the same having secured thereon a cam guideway 13, which is preferably eccentrically disposed relative to the shaft opening 10 for a purpose which will later appear. Adjacent this cam 13 a guide 14 is positioned for coöperation with certain adjuncts of the conveyer mechanism and to properly locate a potato on its way to the conveyer.

15 designates a passage formed in the casing 9 and terminating in an opening 16 through which the potatoes are delivered and allowed to drop upon the ground in proper position. The shaft 12 carries thereon the conveyer mechanism, in the present instance consisting of a rotatable frame formed of two disks 17 and 18 and adapted to be secured together by bolts 19 or equivalent means, whereby a wheel-like structure is formed adapted to rotate with the shaft 12 and carry one potato at a time.

20 designates a hopper located adjacent the conveyer frame and from which the potatoes are delivered by a suitable conveyer 21 or the like to the receiving point of the conveyer frame. The disks 17 and 18 are each provided, as here shown, with a series of radially disposed lugs 22 suitably spaced apart and these disks, as seen in Figs. 10, 11 and 12 are provided with lateral extensions 23, whereby a sufficient space is allowed between the two for the impaling and conveying mechanism now to be described. This impaling and conveying mechanism consists of a plurality of wings or projections 24, each preferably of sufficient size to support a potato thereon, each wing as here shown forming a part of a plate 25 carrying a slotted frame 26, so that when each plate 25 is placed in position between two adjacent lugs 22, the slotted member 26 forms a guide bearing for a sliding member forming an impaler for the potatoes. This impaler consists of a rod 27 provided at one end with a plurality of teeth 28 and having at the other end a guide and stop member 29 for coöperation with the slot of the member 26. It will be noted that the member 18 has a slot 30 therein between each of the lugs 22, each of which forms a guide-way opposite to the guide 26 and coöperates therewith for a like purpose.

31 designates a spring member normally under sufficient tension to maintain the impaler rod 27 in the position shown in Fig. 5, which is its carrying position when in engagement with a potato.

32 designates a cam faced lug preferably integral with the rod 27 and projecting through the guide slot 30 to engage in its path of movement with the cam 13, whereby the impaler rod 27 and teeth 28 are drawn inwardly far enough to release the potato or the like which is being carried thereon. It will of course be understood that suitable driving mechanism as the sprocket 33 and the coöperating chain drive mechanism are provided for proper movement of the parts to produce the functions described.

In operation, the hopper 20 is filled with potatoes, which, as customary, are cut into suitable sized pieces for seed purposes and which are delivered by means of the conveyer 21 to a point adjacent the end of cam 13, so that as the impaling mechanism is operated a potato or a part thereof is picked up and carried to the discharge opening of the conveyer mechanism. It will be clear that at the time a potato is delivered from the conveyer 21 to the conveyer mechanism, one of the impalers 27, which has been in engagement with the cam 13 through the medium of the stop 32, will be released and the spring 31 operate to throw it outwardly and pierce the potato. As the entire conveyer frame or wheel rotates, the potatoes thus picked up will be carried around the frame until the cam 13 acts upon the stop 32 to withdraw the impaler 27 from holding position, at which time the potato is in position to drop into the opening or passage 15 and be deposited upon the ground. If at any time an impaler fails to pick up a potato the operator of the machine who is seated at a suitable point to watch the operations, is able to reach into the hopper and take out another potato and deposit it upon a wing 24 as the conveyer comes around and thus insure the proper spacing and feeding of the potatoes to the furrows.

It will now be apparent that I have devised a simple efficient feeding mechanism operating in conjunction with adjacent portions of the machine to carry a plurality of potatoes, one at a time, from a hopper to a suitable delivery point, the conveyer mechanism being so arranged as to deposit one potato after another at suitable intervals for the correct planting operation.

It will now be apparent that I have devised a novel and useful construction which embodies the features of advantage enumerated as desirable in the statement of the invention and the above description and while I have in the present instance shown and described the preferred embodiment thereof which has been found in practice to give satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:—

1. In a device of the character described, a hopper, a casing communicating with said hopper and provided with an outlet opening, a movable conveyer adapted to deliver potatoes to said casing, a member rotatably mounted in said casing, a plurality of slidingly mounted impalers carried by said member, and yielding means to project each impaler into a potato.

2. In a device of the character described, a hopper, a casing communicating with said hopper and provided with an outlet opening, a movable conveyer adapted to deliver potatoes to said casing, a member rotatably mounted in said casing, a plurality of slidingly mounted impalers carried by said member, and a spring to project each impaler into a potato.

3. In a device of the character described, a hopper, a casing communicating therewith and provided with an outlet opening, a movable conveyer in said hopper adapted to deliver potatoes to said casing, a member rotatably mounted in said casing, a plurality of slidingly mounted impalers carried by said member, and yielding means to project each impaler into a potato.

4. In a device of the character described, a hopper, a casing communicating therewith and provided with an outlet opening, a movable conveyer adapted to deliver potatoes to said casing, a member rotatably mounted in said casing, a plurality of slidingly mounted impalers carried by said member, a spring to project each impaler into a potato, and means coöperating with each impaler to overcome the action of each spring.

5. In a device of the character described, a hopper, a casing communicating therewith and having an outlet opening, a movable conveyer adapted to deliver potatoes to said casing, a member rotatably mounted in said casing, a plurality of slidingly mounted impalers carried by said member, a spring to project each impaler into a potato, and means on said casing adapted to coöperate with each impaler to overcome the action of each spring.

6. In a device of the character described, a hopper, a casing communicating therewith and provided with an outlet opening, a movable conveyer adapted to deliver potatoes to said casing, a member rotatably mounted in said casing, a plurality of slidingly mounted impalers carried by said member, a spring to project each impaler into a potato, a cam on said casing, and means on each impaler adapted to coöperate with said cam to overcome the action of each spring.

7. In a device of the character described, a hopper, a casing communicating therewith and provided with an outlet opening, a movable conveyer in said hopper adapted to deliver potatoes to said casing, a member rotatably mounted in said casing, a plurality of slidingly mounted impalers carried by said member, a spring to project each impaler into a potato, a cam on said casing, and means on each impaler adapted to coöperate with said cam to overcome the tension of each spring.

8. In a device of the character described, a hopper, a casing communicating therewith and provided with an outlet opening, a movable conveyer adapted to deliver potatoes to said casing, a member rotatably mounted in said casing, a plurality of radially disposed slidingly mounted impalers carried by said member, means to project each impaler into a potato, and means operating at a predetermined time to successively draw said impalers in the opposite direction.

9. In a device of the character described, a hopper, a casing communicating therewith and provided with an opening, a movable conveyer in said hopper adapted to deliver potatoes to said casing, a member rotatably mounted in said casing, a plurality of wings carried by said member, an impaler slidingly mounted adjacent each wing, and means on said casing coöperating with each impaler to control the movements thereof at a predetermined time and means to project each impaler into a potato.

ALLEN McWHORTER.

Witnesses:
WM. CANER WIEDERSEIM,
C. D. McVAY.